United States Patent
Manabe et al.

(10) Patent No.: US 7,090,899 B2
(45) Date of Patent: Aug. 15, 2006

(54) LIQUID-CRYSTALLINE MEDIUM HAVING HIGH BIREFRINGENCE

(75) Inventors: Atsutaka Manabe, Wilmshausen/Bensheim (DE); Matthias Bremer, Darmstadt (DE); Elena Kress, Moemlingen (DE)

(73) Assignee: Merck Patent GmbH, Darmstadt (DE)

( * ) Notice: Subject to any disclaimer, the term of this patent is extended or adjusted under 35 U.S.C. 154(b) by 150 days.

(21) Appl. No.: 10/658,471

(22) Filed: Sep. 10, 2003

(65) Prior Publication Data
US 2004/0055529 A1 Mar. 25, 2004

(30) Foreign Application Priority Data
Sep. 11, 2002 (DE) ................. 102 42 013

(51) Int. Cl.
*C09K 19/30* (2006.01)
*C09K 19/12* (2006.01)
(52) U.S. Cl. ............. 428/1.1; 252/299.63; 252/299.66
(58) Field of Classification Search ............. 428/1.1; 252/299.63, 299.66
See application file for complete search history.

(56) References Cited

U.S. PATENT DOCUMENTS 5,599,480 A * 2/1997 Tarumi et al. ......... 252/299.63
6,348,244 B1 * 2/2002 Miyazawa et al. ........... 428/1.1
2003/0222245 A1 * 12/2003 Klasen-Memmer et al. ..... 252/299.66

FOREIGN PATENT DOCUMENTS

DE 10152831 * 7/2002

* cited by examiner

*Primary Examiner*—Shean C. Wu
(74) *Attorney, Agent, or Firm*—Millen, White, Zelano, Branigan, P.C.

(57) ABSTRACT

Liquid-crystalline medium having a dielectric anisotropy $\Delta\epsilon$ of $\geq 3$, comprising compounds of the general formula (I),

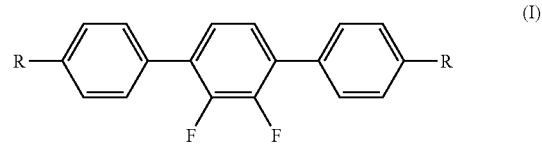

in which R is as defined herein, are suitable for use as liquid-crystalline media for, e.g., IPS, MLC, TN or STN displays, but in particular for LCoS displays. The media have very high specific resistance values, low threshold voltages, short response times and high birefringence values $\Delta n$, while maintaining other boundary conditions.

28 Claims, No Drawings

LIQUID-CRYSTALLINE MEDIUM HAVING HIGH BIREFRINGENCE

The present invention relates to a liquid-crystalline medium and to electro-optical displays containing this medium.

Liquid crystals are used mainly as dielectrics in display devices since the optical properties of such substances can be influenced by an applied voltage. Electro-optical devices based on liquid crystals are extremely well known to the person skilled in the art and can be based on various effects. Devices of this type are, for example, cells with dynamic scattering, DAP cells (deformation of aligned phases), guest/host cells, TN (twisted nematic) cells having a twisted nematic structure, STN (super-twisted nematic) cells, SBE (superbirefringence effect) cells and OMI (optical mode interference) cells. The most common display devices are based on the Schadt-Helfrich effect and have a twisted nematic structure.

In general, the liquid-crystal materials must have good chemical and thermal stability and good stability to electric fields and electromagnetic radiation. Furthermore, the liquid-crystal materials should have low viscosity and give rise to short response times, low threshold voltages and high contrast in the cells.

Furthermore, they should have a suitable mesophase, for example a nematic mesophase for the above-mentioned cells, at conventional operating temperatures, i.e. in the broadest possible range below and above room temperature. Since liquid crystals are generally used as mixtures of a plurality of components, it is important that the components are readily miscible with one another. Further properties, such as the electrical conductivity, the dielectric anisotropy and the optical anisotropy, have to meet various requirements depending on the cell type and area of application. For example, materials for cells having a twisted nematic structure should have a positive dielectric anisotropy and low electrical conductivity.

For example, for matrix liquid-crystal displays having integrated nonlinear elements for switching individual pixels (MLC displays), liquid-crystalline media having large positive dielectric anisotropy, broad nematic phases, relatively low birefringence, very high specific resistance, good light and temperature stability and low vapour pressure are desired.

Matrix liquid-crystal displays of this type are known. Besides passive elements, such as varistors or diodes, the nonlinear elements used for individual switching of the individual pixels can be active elements, such as transistors. The term "active matrix" is then used.

The electro-optical effect used in the highly promising TFT (thin film transistor) displays is usually the TN effect. A distinction is made between TFTs comprising compound semiconductors, such as, for example, CdSe, and TFTs based on polycrystalline or amorphous silicon.

The TFT matrix is applied to the inside of one glass plate of the display, while the other glass plate carries the transparent counterelectrode on the inside. Compared with the size of the pixel electrode, the TFT is very small and has virtually no adverse effect on the image. This technology can also be extended to fully colour-compatible displays, in which a mosaic of red, green and blue filters is arranged in such a way that a filter element is arranged opposite each switchable pixel. The TFT displays usually work as TN cells with crossed polarisers in transmission and are illuminated from the back.

MLC displays of this type are employed as displays in notebook computers, TV sets (pocket televisions) and in automobile or aircraft construction. The angle dependence of the contrast and the response times of these MLC displays are not always satisfactory here.

Difficulties are also caused by inadequately high specific resistance of the liquid-crystal mixtures. With decreasing resistance, the contrast of an MLC display worsens, and the problem of "image sticking" can occur. Since the specific resistance of the liquid-crystal mixture generally decreases over the life of an MLC display due to interaction with the inside surfaces of the display, a high (initial) resistance is very important in order to give acceptable lives. In particular, in the case of mixtures having a low threshold voltage, it has hitherto not been possible to achieve very high specific resistance values since liquid-crystalline materials having high positive dielectric anisotropy $\Delta\epsilon$ generally also have relatively high electrical conductivity. It is furthermore important that the specific resistance exhibits the smallest possible increase with increasing temperature and after exposure to heat and/or light. In order to achieve short response times of the displays, the mixtures must furthermore have low rotational viscosity. In order also to facilitate use of the displays at low temperatures, for example for applications outdoors, in automobiles or in avionics, crystallisation and/or Semitic phases should not occur even at low temperatures, and the temperature dependence of the viscosity must be as low as possible.

Liquid-crystal mixtures having a favourable property profile are also required in the liquid-crystal-on-silicon (LCOS) projection displays which have been developed recently. Owing to the small pixel size in the region of 20 μm, the high resolution and the desired short response times of the displays, small layer thicknesses are necessary, for the achievement of which liquid-crystal mixtures having a comparatively high value of the optical birefringence $\Delta n$ are needed. Liquid-crystalline compounds having high birefringence frequently have an intrinsic Semitic phase or induce the formation of a Semitic phase when mixed with other liquid-crystalline compounds, which has an adverse effect on the low-temperature stability of the displays.

There is thus a high demand for liquid-crystalline media having the following properties:

high birefringence $\Delta n$ for small layer thicknesses of the displays;

high positive dielectric anisotropy $\Delta\epsilon$ for low threshold voltage $V_{th}$;

low rotational viscosity $\gamma_1$ for short response times;

high stability to light radiation for a long life of the displays;

nematic phase range extended in particular to low temperatures and low temperature dependence of the viscosity for use of the displays at low temperatures too.

The invention has an object of providing liquid-crystalline media for IPS, MLC, TN or STN displays, but in particular for LCoS displays, which have very high specific resistance values, low threshold voltages, short response times and high birefringence values $\Delta n$ while maintaining the other boundary conditions.

Upon further study of the specification and appended claims, further objects and advantages of this invention will become apparent to those skilled in the art.

These objects are achieved by a liquid-crystalline medium having a dielectric anisotropy Δε of ≧3, comprising compounds of the general formula (I)

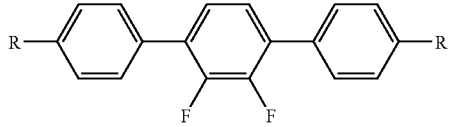
(I)

in which
R, independently of one another, are an alkyl, alkoxy or alkenyl radical having 1–15 or 2–15 carbon atoms respectively, in which one or more CH$_2$ groups may be replaced by —O— in such a way that oxygen atoms are not adjacent.

Δε is preferably ≧5.

Compounds of the formula (I) have high optical anisotropy Δn, a very high clearing point, low rotational viscosity and good low-temperature stability. In spite of the negative Δε they are very highly suitable as mixture component in liquid-crystal mixtures of high positive Δε.

Preferred liquid-crystalline media comprise
a) from 1 to 50% by weight of one or more compounds of the general formula (I)
b) from 5 to 90% by weight of one or more compounds of the general formulae (II) to (V)

R-a-b-Z-c-X  (II)

in which
a, b and c, independently of one another, can be

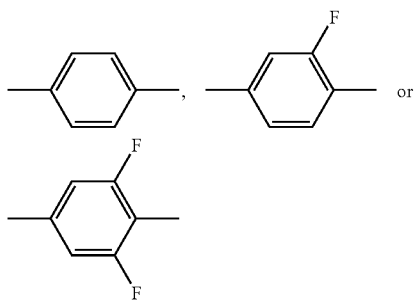

R can be an alkyl, alkoxy or alkenyl radical having from 1 to 15 or 2 to 15 carbon atoms respectively, in which one or more CH$_2$ groups may be replaced by —O— in such a way that oxygen atoms are not adjacent,
X can be —F, —OCF$_3$, —OCF$_2$H, —Cl or —CF$_3$, and
Z can be a single bond or —CH$_2$—CH$_2$—, R-d-e-f-X  (III)

in which d can be 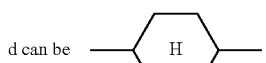

e can be 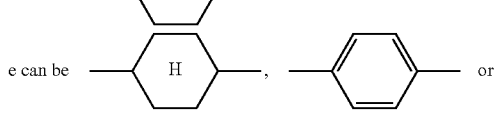 or f can be 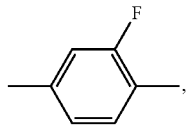, 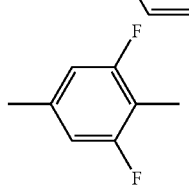 or and X and R are as defined above, R-e-f-X  (IV)

in which
e, f, R and X are as defined above,

R-g-h-i-j-X  (V)

in which g can be 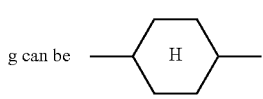

h can be 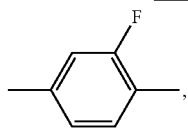, 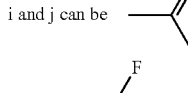 or

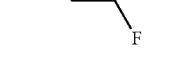, i and j can be 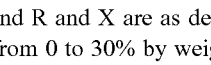, 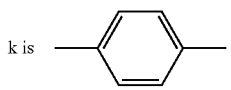 or

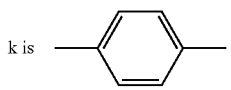

and R and X are as defined above,
c) from 0 to 30% by weight of one or more compounds of the general formula (VI)

R-k-l-m-R$^1$  (VI)

in which k is 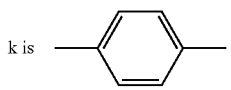

l and m, independently of one another, can be

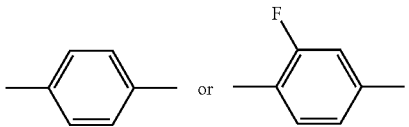

R is as defined above, and $R^1$, in addition to the meanings of R, can be —F or —Cl, d) from 0 to 30% by weight of one or more compounds of the general formula (VII)

R-n-o-p-q-R     (VII)

in which

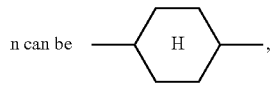

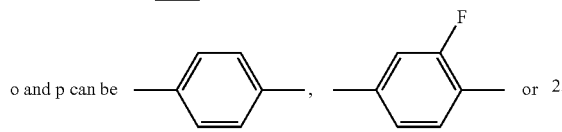

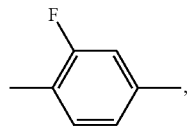

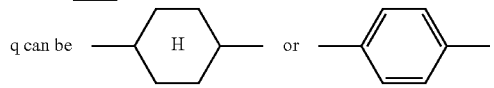

and

R are independent of one another and are as defined above, e) from 0 to 40% by weight of one or more compounds of the general formulae (VIII), (IX) and/or (X)

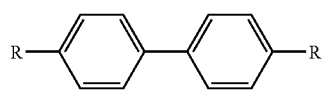
(VIII)

in which

R are independent of one another and are as defined above,

R-r-s-t-$R^2$     (IX)

R-r-s-t-u-F     (X)

in which

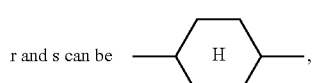

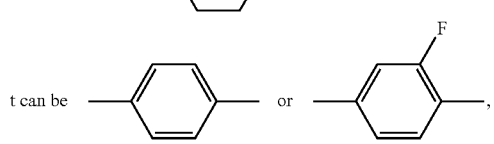

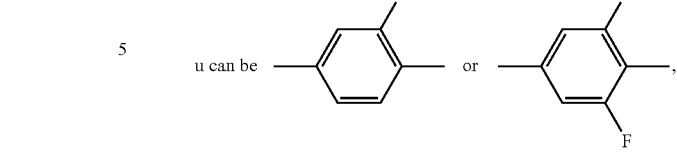

R is as defined above, and $R^2$, in addition to the meanings of R, can be —F, where the sum of components a) to e) is 100% by weight.

R, $R^1$ and $R^2$ in the formulae (I) to (X) can be an alkyl radical or alkoxy radical having from 1 to 15 carbon atoms, which may be straight-chain or branched. It is preferably straight-chain, has 1, 2, 3, 4, 5, 6 or 7 carbon atoms and accordingly is preferably methyl, ethyl, propyl, butyl, pentyl, hexyl, heptyl, methoxy, ethoxy, propoxy, butoxy, pentoxy, hexoxy or heptoxy, furthermore octyl, nonyl, decyl, undecyl, dodecyl, tridecyl, tetradecyl, pentadecyl, octoxy, nonoxy, decoxy, undecoxy, dodecoxy, tridecoxy, tetradecoxy or pentadecoxy.

R, $R^1$ and $R^2$ can be oxaalkyl, preferably straight-chain 2-oxapropyl (=methoxymethyl), 2- (=ethoxymethyl) or 3-oxabutyl (=methoxyethyl), 2-, 3- or 4-oxapentyl, 2-, 3-, 4- or 5-oxahexyl, 2-, 3-,4-, 5- or 6-oxaheptyl, 2-, 3-, 4-, 5-, 6- or 7-oxaoctyl, 2-, 3-, 4-, 5-, 6-, 7-, or 8-oxanonyl, or 2-, 3-, 4-, 5-,6-, 7-, 8- or 9-oxadecyl.

R, $R^1$ and $R^2$ can be an alkenyl radical having from 2 to 15 carbon atoms, which may be straight-chain or branched. It is preferably straight-chain and has from 2 to 7 carbon atoms. Accordingly, it is in particular vinyl, prop-1- or -2-enyl, but-1-, -2- or -3-enyl, pent-1-, -2-, -3- or -4-enyl, hex-1-, -2-, -3-, -4- or -5-enyl, or hept-1-, -2-, -3-, -4-, -5- or -6-enyl.

Preferred compounds of the general formula (I) are those in which R, independently of one another (identical or different), are an alkyl or alkoxy radical having 1–7 carbon atoms. Particularly preferably, both R are an alkyl radical or only one R is an alkoxy radical.

Preferred compounds of the general formula (II) are the following compounds of the general formulae (IIa) to (IIg):

| | |
|---|---|
| R-P-G-U-X | (IIa) |
| R-P-G-G-X | (IIb) |
| R-G-G-G-X | (IIc) |
| R-G-G-U-X | (IId) |
| R-G-G-P-X | (IIe) |
| R-G-P-G-X | (IIf) |
| R-G-P-E-P-X | (IIg) | in which

P is 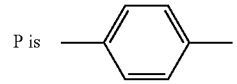

G is 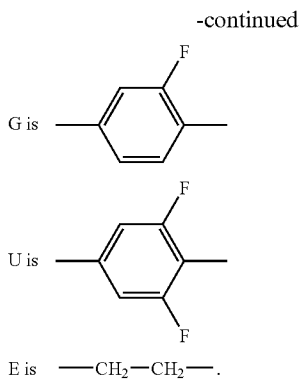

U is

E is —CH$_2$—CH$_2$—.

Preferred compounds of the general formulae (III) to (V) are the following compounds of the general formulae (IIIa) to (IIIf), (IVa) to (IVf) and (Va) to (Vd):

| | |
|---|---|
| R-C-P-G-X | (IIIa) |
| R-C-P-U-X | (IIIb) |
| R-C-C-G-X | (IIIc) |
| R-C-C-U-X | (IIId) |
| R-C-G-U-X | (IIIe) |
| R-C-G-G-X | (IIIf) |
| R-G-U-X | (IVa) |
| R-G-G-X | (IVb) |
| R-P-U-X | (IVc) |
| R-C-P-X | (IVd) |
| R-C-G-X | (IVe) |
| R-C-U-X | (IVf) |
| R-C-C-P-U-X | (Va) |
| R-C-P-G-U-X | (Vb) |
| R-C-P-G-G-X | (Vc) |
| R-C-C-G-U-X | (Vd) | in which

C is ,

P is ,

G is , and

U is

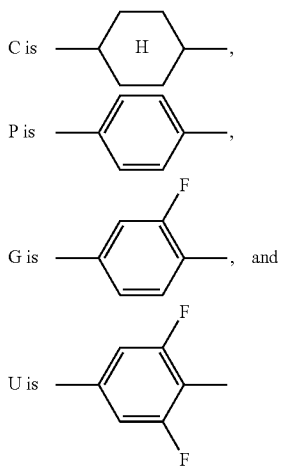

and R and X are as defined above.

Particularly preferred compounds of the general formulae (II) to (V) are those in which R is an alkyl radical having from 1 to 7 carbon atoms, and X=F or Cl.

Preferred compounds of the general formulae (VI) and (VII) are the following compounds of the general formulae (VIa) to (VIc) and (VIIa) to (VIIg):

| | |
|---|---|
| R-P-Gl-Gl-F | (VIa) |
| R-P-Gl-Gl-Cl | (VIb) |
| R-P-G-P-R | (VIc) |
| R-C-P-P-C-R | (VIIa) |
| R-C-G-P-C-R | (VIIb) |
| R-C-P-G-P-R | (VIIc) |
| R-C-P-Gl-P-R | (VIId) |
| R-C-G-P-P-R | (VIIe) |
| R-C-Gl-P-P-R | (VIIf) |
| R-C-Gl-P-C-R | (VIIg) | in which

R are each independent of one another and are as defined above,

C is 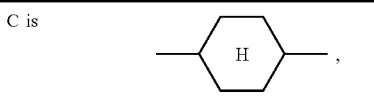,

P is 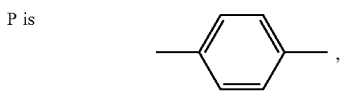,

G is 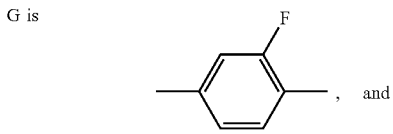, and

Gl is 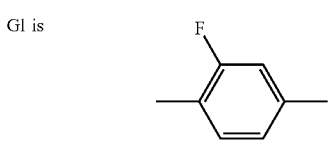

Preferred compounds of the general formulae (VI) and (VII) are those in which R is an alkyl radical having from 1 to 7 carbon atoms.

The compounds of the general formulae (I) to (X) are reproduced below by means of acronyms.

In these, "C", "P", "G", "Gl", "U" and "E" are as defined above. Furthermore, the acronyms have the following meanings:

| | | |
|---|---|---|
| "n" | R, R$^1$ or R$^2$ = | —C$_n$H$_{2n+1}$ |
| "V" | R, R$^1$ or R$^2$ = | —CH=CH$_2$ |
| "Vl" | R, R$^1$ or R$^2$ = | —CH=CH—C$_j$H$_{2l+1}$ |
| "kVl" | R, R$^1$ or R$^2$ = | —C$_k$H$_{2k}$—CH=CH—C$_l$H$_{2i+1}$ |
| "lVk" | R, R$^1$ or R$^2$ = | C$_l$H$_{2l+1}$—CH=CH—C$_k$H$_{2k}$— |
| "On" | R, R$^1$ or R$^2$ = | —OC$_n$H$_{2n+1}$ |
| "nO" | R, R$^1$ or R$^2$ = | C$_n$H$_{2n+1}$O— |
| "F" | X, R$^1$ or R$^2$ = | —F |
| "Cl" | X or R$^1$ = | —Cl |
| "OT" | X, R$^1$ or R$^2$ = | —OCF$_3$ |
| "TO" | X, R$^1$ or R$^2$ = | F$_3$CO— |
| "T" | X, R$^1$ or R$^2$ = | —CF$_3$ |

The substituent on the left-hand side of a structural formula here is indicated first and then—separated by a hyphen—the substituent on the right-hand side.

For example, the particularly preferred compounds of the formula (I) are abbreviated as follows: PYP-n-m, PYP-n-Om, where n and m=1-7.

Especially preferred compounds of the formula (I) are PYP-1-2, PYP-2-2, PYP-2-3, PYP-2-4, PYP-3-1, PYP-3-3, PYP-3-5, PYP-3—O2 and PYP-3—O4.

The particularly preferred compounds of the general formulae (IIa) to (IIg) are abbreviated as follows: GGP-n-Cl, GPEP-n-Cl, where n=1 to 7.

Especially preferred compounds of the general formula (III) are CPG-2-F, CPG-3-F, CPG-5-F, CGU-2-F, CGU-3-F, CGU-5-F, CPU-2-F, CPU-3-F and CPU-5-F.

An especially preferred compound of the general formula (V) is CCGU-3-F.

An especially preferred compound of the general formula (VI) is PGIGI-3-F.

Especially preferred compounds of the general formula (VII) are CGPC-3-3, CPPC-3-3, CPPC-5-3, CGPC-5-3, CPPC-5-5 and CGPC-5-5.

Preferred compounds of the general formula (VIII) are PP-n-m, PP-n-mVo where n, m and o=1 to 7.

Preferred compounds of the general formula (IX) are CCP-n-m, CCG-n-m where n and m=1 to 7, and particularly preferably CCP-V-1, CCP-V2-1 and CCG-V-F.

Preferred liquid-crystalline media comprise components a) to e) in the following weight ratios:
a) from 1 to 50% by weight of one or more compounds of the general formula (I),
b) from 5 to 90% by weight of one or more compounds of the general formulae (II) to (V),
c) from 0 to 30% by weight of one or more compounds of the general formula (VI),
d) from 0 to 20% by weight of one or more compounds of the general formula (VII),
e) from 0 to 50% by weight of one or more compounds of the general formulae (VIII), (IX) and/or (X), where the sum of components a) to e) is 100% by weight.

Component b) consists, in particular, of
b1) from 20 to 80% by weight of one or more compounds of the general formula (II), and
b2) from 80 to 20% by weight of one or more compounds of the general formulae (III) to (V), where the sum of components b1) and b2) is 100% by weight.

Especially preferred liquid-crystalline media comprise
b) as compounds of the general formula (II), compounds of the formulae (IIe) and/or (IIg)

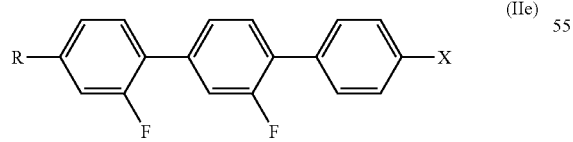

(IIe)

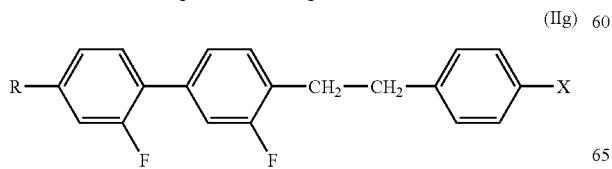

(IIg)

in which
R is an alkyl radical having 1–7 carbon atoms, and X=Cl,
c) as compounds of the general formula (VI), compounds of the formula (VIa)

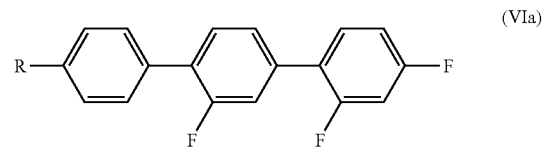

(VIa)

in which
R is an alkyl radical having 1–7 carbon atoms,
d) as compounds of the general formula (VII), compounds of the formulae (VIIa) and/or (VIIb)

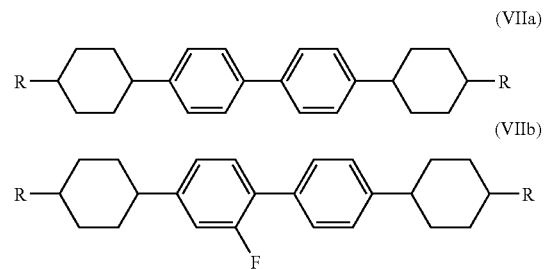

(VIIa)

(VIIb)

in which
R is an alkyl radical having 1–7 carbon atoms,
e) as compounds of the general formulae (VIII), (IX) and/or (X), one or more of the compounds

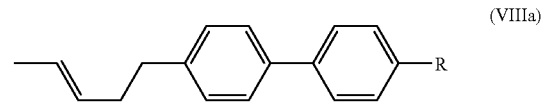

(VIIIa)

in which
R is an alkyl radical having from 1 to 7 carbon atoms,

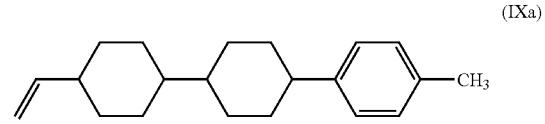

(IXa)

(IXb)

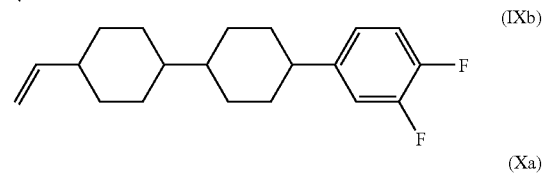

(Xa)

in which
R is an alkyl radical having 1–7 carbon atoms.

In particular, these essentially consist of compounds of the formulae
a) (I)
b) (IIe) and/or (IIg)
c) (VIa)
d) (VIIa) and/or (VIIb)
e) (VIII), (IXa), (IXb) and/or (Xa).

In a specific embodiment, this medium essentially consists of
a) 1–50% by weight, preferably 5–50% by weight, of one or more compounds of the formula (I),
b1) 5–50% by weight, preferably 10–40% by weight, of one or more compounds of the formula (IIe),
b2) 5–50% by weight, preferably 10–40% by weight, of one or more compounds of the formula (IIg),
c) 0–30% by weight, preferably 2–20% by weight, of one or more compounds of the formula (VIa),
d) 0–20% by weight, preferably 2–15% by weight, of one or more compounds of the formulae (VIIa) and/or (VIIb),
e1) 0–40% by weight, preferably 5–40% by weight, of one or more compounds of the formula (VIIa),
e2) 0–40% by weight, preferably 5–30% by weight, of one or more compounds of the formulae (IXa) and/or (IXb), and
e3) 0–25% by weight, preferably 2–20% by weight, of one or more compounds of the formula (Xa).

The compounds are prepared by methods known per se, as described in the literature (for example in the standard works, such as Houben-Weyl, Methoden der Organischen Chemie [Methods of Organic Chemistry], Georg-Thieme-Verlag, Stuttgart), to be precise under reaction conditions which are known and suitable for the said reactions. Use can also be made here of variants which are known per se, but are not mentioned here in greater detail. Furthermore, the compounds of the formulae (I) to (X) can be prepared as described in the relevant patent literature.

The invention also relates to electro-optical displays, in particular STN or MLC displays, having two plane-parallel outer plates which, with a frame, form a cell, integrated nonlinear elements for switching individual pixels on the outer plates, and a nematic liquid-crystal mixture of positive dielectric anisotropy located in the cell, which displays contain liquid-crystalline media according to the invention, and to the use of these media for electro-optical displays. In particular, the invention also relates to LCoS displays which contain the liquid-crystalline media according to the invention.

The liquid-crystal mixtures according to the invention enable a significant extension of the available parameter latitude.

The achievable combinations of clearing point, rotational viscosity, optical anisotropy $\Delta n$ and threshold voltage exceed those of the previous materials from the prior art.

It has hitherto only been possible to meet the requirement for high birefringence at the same time as a high clearing point and a broad nematic phase range to an inadequate extent.

The liquid-crystal mixtures according to the invention enable clearing points above 80° C., preferably above 90° C., particularly preferably above 95° C., at the same time birefringence values of $\geq 0.17$, preferably $\geq 0.18$, particularly preferably $\geq 0.20$, a low threshold voltage and at the same time low rotational viscosity to be achieved while retaining the nematic phase down to −15° C. and preferably down to −20° C., particularly preferably down to −25° C.

The construction of the STN and MLC display according to the invention from polarisers, electrode base plates and electrodes with surface treatment corresponds to the usual design for displays of this type. The term usual design here is broadly drawn and also covers all derivatives and modifications of the MLC display, in particular also matrix display elements based on poly-Si TFT or MIM displays and IPS.

The liquid-crystal mixtures which can be used in accordance with the invention are prepared in a manner which is conventional per se. In general, the desired amount of the components used in lesser amount is dissolved in the components making up the principal constituent, advantageously at elevated temperature. It is also possible to mix solutions of the components in an organic solvent, for example in acetone, chloroform or methanol, and, after mixing, to remove the solvent again, for example by distillation. It is furthermore possible to prepare the mixtures in other conventional ways, for example by use of premixes, for example homologue mixtures, or using so-called "multi-bottle" systems.

In the foregoing and in the following examples, all temperatures are set forth uncorrected in degrees Celsius; and, unless otherwise indicated, all parts and percentages are by weight.

The entire disclosure of all applications, patents and publications, cited above and below, and of corresponding German Application No. 10242013.0, filed Sep. 11, 2002 is hereby incorporated by reference.

The invention is explained in greater detail by the following examples:

EXAMPLES A TO J AND COMPARATIVE EXAMPLE

Liquid-crystal mixtures having the stated composition were prepared. The following were measured for these mixtures:

temperature of the Semitic-nematic phase transition S→N [° C.];
the clearing point [° C.];
the optical anisotropy $\Delta n$ at 589 nm and 20° C.;
the dielectric anisotropy $\Delta \epsilon$ at 1 kHz and 20° C.
the rotational viscosity $\gamma_1$ at 20° C. [mPa.s];
The electro-optical data were measured in a TN cell at the 1st minimum (d·$\Delta n$=0.5 µm) at 20° C.

Example A

| Component | [% by wt.] |
|---|---|
| GPEP-2-Cl | 12 |
| GPEP-3-Cl | 6 |
| GPEP-5-Cl | 10 |
| GGP-3-Cl | 8 |
| GGP-5-Cl | 20 |
| PP-1-2V1 | 10 |
| PP-3-2V1 | 7 |
| CGPC-5-3 | 5 |
| CGPC-3-3 | 4 |
| CCG-V-F | 8 |
| CCP-V-1 | 6 |
| PYP-3-3 | 4 |

S → N [° C.]: <−30
Clearing point [° C.]: +98.5
$\Delta n$: +0.2101
$\Delta \epsilon$: +5.7
$\gamma_1$ [mPa.s]: 275

Example B

| Component | [% by wt.] |
|---|---|
| GPEP-2-Cl | 12 |
| GPEP-3-Cl | 7 |
| GPEP-5-Cl | 12 |
| GGP-3-Cl | 8 |
| GGP-5-Cl | 20 |
| PP-1-2V1 | 9 |
| CGPC-5-3 | 2 |
| CGPC-3-3 | 2 |
| CCG-V-F | 10 |
| CCP-V-1 | 7 |
| PYP-3-3 | 2 |
| PYP-3-5 | 3 |
| PGlGl-3-F | 6 |

S → N [° C.]: <-30  
Clearing point [° C.]: +95  
Δn: +0.2108  
Δε: +6.0  
$\gamma_1$ [mPa.s]: 292

Example C

| Component | [% by wt.] |
|---|---|
| GPEP-2-Cl | 12 |
| GPEP-3-Cl | 6 |
| GPEP-5-Cl | 11 |
| GGP-3-Cl | 8 |
| GGP-5-Cl | 22 |
| PP-1-2V1 | 10 |
| CGPC-5-3 | 3 |
| CCG-V-F | 11 |
| CCP-V-1 | 8 |
| PYP-3-O2 | 2 |
| PYP-3-O4 | 2 |
| PGlGl-3-F | 5 |

S → N [° C.]: <-30  
Clearing point [° C.]: +95  
Δn: +0.2104  
Δε: +6.1  
$\gamma_1$ [mPa.s]: 279

Example D

| Component | [% by wt.] |
|---|---|
| GPEP-2-Cl | 10 |
| GPEP-3-Cl | 6 |
| GPEP-5-Cl | 10 |
| GGP-3-Cl | 8 |
| GGP-5-Cl | 22 |
| PP-1-2V1 | 9 |
| CGPC-5-3 | 2 |
| CGPC-3-3 | 2 |
| CCG-V-F | 9 |
| CCP-V-1 | 11 |
| PYP-3-3 | 3 |
| PYP-3-5 | 3 |
| PGlGl-3-F | 5 |

S → N [° C.]: <-30  
Clearing point [° C.]: +99.5  
Δn: +0.2091  
Δε: +5.5  
$\gamma_1$ [mPa.s]: 268

Example E

| Component | [% by wt.] |
|---|---|
| GPEP-2-Cl | 12 |
| GPEP-3-Cl | 6 |
| GPEP-5-Cl | 12 |
| GGP-3-Cl | 8 |
| GGP-5-Cl | 22 |
| PP-1-2V1 | 10 |
| CGPC-5-3 | 3 |
| CGPC-3-3 | 2 |
| CCG-V-F | 8 |
| CCP-V-1 | 11 |
| PYP-2-3 | 6 |

S → N [° C.]: <-30  
Clearing point [° C.]: +100  
Δn: +0.2090  
Δε: +5.8  
$\gamma_1$ [mPa.s]: 268

Example F

| Component | [% by wt.] |
|---|---|
| GPEP-2-Cl | 10 |
| GPEP-3-Cl | 6 |
| GPEP-5-Cl | 10 |
| GGP-3-Cl | 8 |
| GGP-5-Cl | 23 |
| PP-1-2V1 | 10 |
| CGPC-5-3 | 3 |
| CCG-V-F | 10 |
| CCP-V-1 | 12 |
| PYP-3-O2 | 3 |
| PYP-3-O4 | 2 |
| PGlGl-3-F | 3 |

S → N [° C.]: <-30  
Clearing point [° C.]: +100  
Δn: +0.2079  
Δε: +5.7  
$\gamma_1$ [mPa.s]: 269

Example G

| Component | [% by wt.] |
|---|---|
| GPEP-2-Cl | 9 |
| GPEP-3-Cl | 4 |
| GPEP-5-Cl | 9 |
| GGP-3-Cl | 9 |
| GGP-5-Cl | 24 |
| PP-1-2V1 | 10 |
| CCG-V-F | 15 |
| CCP-V-1 | 7 |
| PYP-3-O2 | 5 |
| PYP-3-O4 | 5 |
| CCGU-3-F | 3 |

S → N [° C.]: <-30  
Clearing point [° C.]: +101  
Δn: +0.2100  
Δε: +6.8  
$\gamma_1$ [mPa.s]: 309

Example H

| Component | [% by wt.] |
|---|---|
| GPEP-2-Cl | 11 |
| GPEP-3-Cl | 4 |
| GPEP-5-Cl | 9 |
| GGP-3-Cl | 8 |
| GGP-5-Cl | 23 |
| PP-1-2V1 | 10 |
| CCG-V-F | 8 |
| CCP-V-1 | 12 |
| PYP-2-3 | 5 |
| PYP-3-1 | 5 |
| CCGU-3-F | 5 |

S → N [° C.]: <−30
Clearing point [° C.]: +99.5
Δn: +0.2092
Δε: +6.6
γ₁ [mPa.s]: 273

Example I

| Component | [% by wt.] |
|---|---|
| GPEP-2-Cl | 12 |
| GPEP-3-Cl | 4 |
| GGP-3-Cl | 9 |
| GGP-5-Cl | 27 |
| PP-1-2V1 | 11 |
| CCG-V-F | 4 |
| PYP-2-3 | 7 |
| PYP-3-5 | 7 |
| CCGU-3-F | 3 |
| CC-5-V | 5 |
| CC-3-V1 | 6 |
| CPPC-3-3 | 3 |
| CGPC-3-3 | 2 |

S → N [° C.]: <−30
Clearing point [° C.]: +98.5
Δn: +0.2105
Δε: +5.7
γ₁ [mPa.s]: 204

Example J

| Component | [% by wt.] |
|---|---|
| GPEP-2-Cl | 6 |
| GPEP-3-Cl | 3 |
| GPEP-5-Cl | 4 |
| GGP-3-Cl | 9 |
| GGP-5-Cl | 26 |
| CCG-V-F | 9 |
| PYP-2-3 | 5 |
| PYP-2-4 | 5 |
| CCGU-3-F | 9 |
| PGlGl-3-F | 3 |
| CGU-2-F | 3 |
| CGU-3-F | 4 |
| CPU-3-F | 7 |
| CPU-5-F | 7 |

S → N [° C.]: <−20
Clearing point [° C.]: +99.5
Δn: +0.2013
Δε: +11.2
γ₁ [mPa.s]: 325

Comparative Example

| Component | [% by wt.] |
|---|---|
| GGP-5-Cl | 16 |
| CPG-2-F | 11 |
| CPG-3-F | 11 |
| CPG-5-F | 6 |
| CGU-2-F | 9 |
| CGU-3-F | 9 |
| CGU-5-F | 8 |
| CPU-3-F | 8 |
| CCGU-3-F | 7 |
| CPP-3-2 | 10 |
| CPPC-3-3 | 3 |
| CPPC-5-3 | 2 |

S → N [° C.]: <−20
Clearing point [° C.]: +102.0
Δn: +0.1610
Δε: +10.9
γ₁ [mPa.s]: 277

The preceding examples can be repeated with similar success by substituting the generically or specifically described materials and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

That which is claimed is:

1. A liquid-crystalline medium having a dielectric anisotropy Δε of ≥ 3, comprising:
   one or more compounds of formula (i)

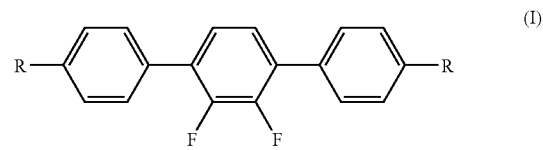

in which
   R in each case, independently of one another, is an alkyl, alkoxy alkenyl radical having 1–15 or 2–15 carbon atoms respectively, in which one or more CH₂ groups may be replaced by —O— in such a way that oxygen atoms are not adjacent, and
   one or more compounds selected from formula (II) and formula (VIII)

R-a-b-Z-c-X   (II)

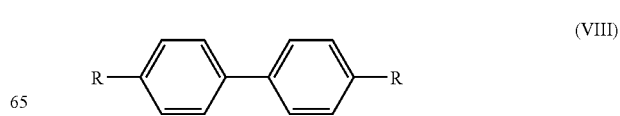

in which

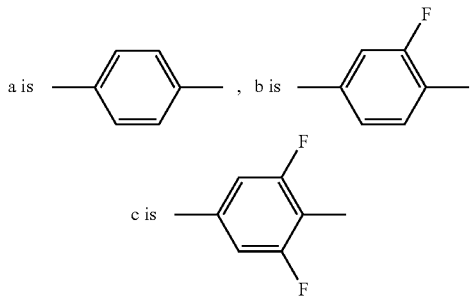

R is an alkyl having from 1 to 15 or 2 to 15 carbon atoms, alkoxy having from 1 to 15 or 2 to 15 carbon atoms or alkenyl having from 2 to 15 carbon atoms, in which in each case one or more CH$_2$ groups may be replaced by —O— in such a way that oxygen atoms are not adjacent, X is —F, —OCF$_3$, —OCF$_2$H, —Cl or —CF$_3$, Z is a single bond or —CH$_2$—CH$_2$.

2. A liquid-crystalline medium acording to claim 1, wherein said medium contains:
 a) 1 to 50% by weight of one or more compounds of formula (I);
 b) 5 to 90% by weight of one or more compounds selected from formula (II) and/or one or more additional compounds selected from formulae (III) to (V)

R-a-b-Z-c-X (II);

R-d-e-f-X (III)

in which

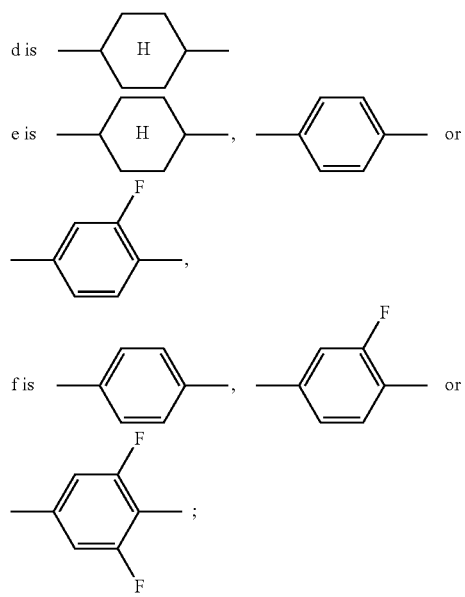

R is an alkyl, alkoxy or radical having from 1 to 15 or 2 to 15 carbon atoms respectively, in which one or more CH$_2$ groups may be replaced by —O— in such a way that oxygen atoms are not adjacent, X is —F, —OCF$_3$, —OCF$_2$H, —Cl or —CF$_3$;

R-e-f-X (IV)

in which
e, f, R and X are defined above;

R-g-h-i-j-X (V)

in which

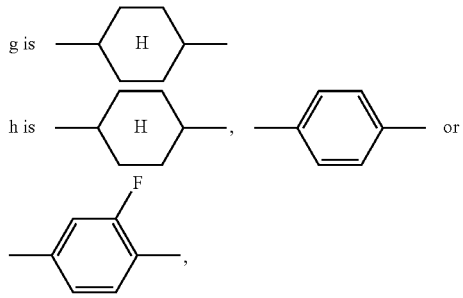

i and j are each independently

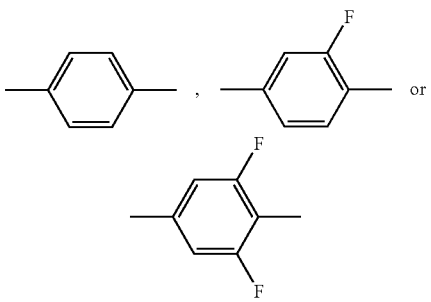

and R and X are defined above;

c) 0 to 30% by weight of one or more additional compounds of formula (VI)

R-k-l-m-R$^1$ (VI)

in which k is 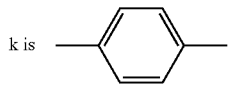

l and m, independently of one another, can be

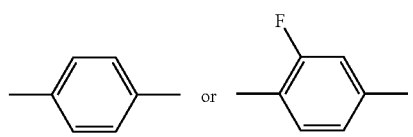

R is as defined above, and

R$^1$, is —F, —Cl, or an alkyl, alkoxy or alkenyl radical having 1–15 or 2–15 carbon atoms respectively, in which one or more CH$_2$ groups may be replaced by —O— in such a way that oxygen atoms are not adjacent;

d) 0 to 30% by weight of one or more additional compounds of formula (VII)

R-n-o-p-q-R　　(VII)

in which n is 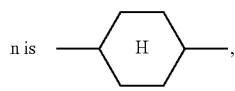, o and p are each independently

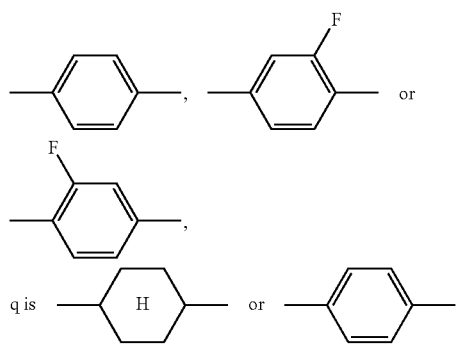

q is 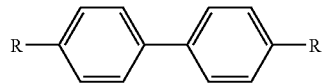

and

R are independent of one another and are as defined above; and e) up to 40% by weight of one or more compounds selected from formula (VIII), and/or one or more additional compounds selected from formula formulae (IX) and/or (X)

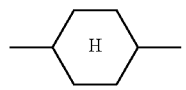 (VIII)

R-r-s-t-R²　　(IX)

R-r-s-t-u-F　　(X)

in which

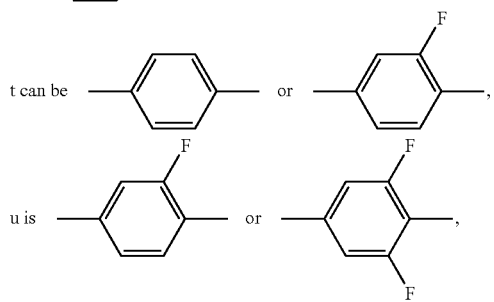

R is as defined above, and

R², is —F or an alkyl, alkoxy or alkenyl radical having 1–15 or 2–15 carbon atoms respectively, in which one or more CH₂ groups may be replaced by —O— in such a way that oxygen atoms are not adjacent;

where the sum of components a) to e) is 100% by weight.

3. A liquid-crystalline medium according to claim 2, wherein compounds of formulae (III) to (V) are selected from the following compounds of formulae (IIIa) to (IIIf), (IVa) to (IVf) and (Va) to Vd), respectively,

| | |
|---|---|
| R-C-P-G-X | (IIIa) |
| R-C-P-U-X | (IIIb) |
| R-C-C-G-X | (IIIc) |
| R-C-C-U-X | (IIId) |
| R-C-G-U-X | (IIIe) |
| R-C-G-G-X | (IIIf) |
| R-G-U-X | (IVa) |
| R-G-G-X | (IVb) |
| R-P-U-X | (IVc) |
| R-C-P-X | (IVd) |
| R-C-G-X | (IVe) |
| R-C-U-X | (IVf) |
| R-C-C-P-U-X | (Va) |
| R-C-P-G-U-X | (Vb) |
| R-C-P-G-G-X | (Vc) |
| R-C-C-G-U-X | (Vd) | in which

C is 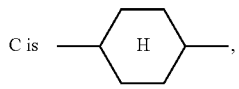,

P is 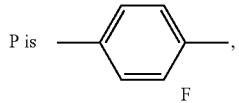,

G is 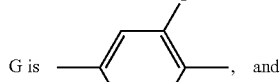, and

U is 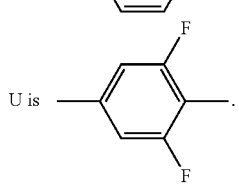.

4. A liquid-crystalline medium according to claim 2, wherein, in the formulae (II) to (V), R is an alkyl radical having from 1 to 7 carbon atoms, and X is —F or —Cl.

5. A liquid-crystalline medium according to claim 1, wherein said medium contains i) one or more compounds of formulae (IIe) and/or (IIg)

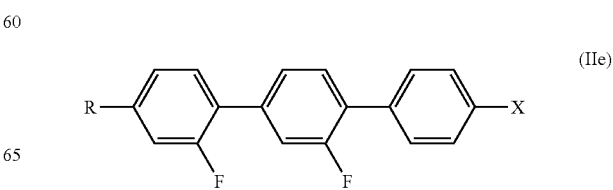 (IIe)

-continued (IIg)
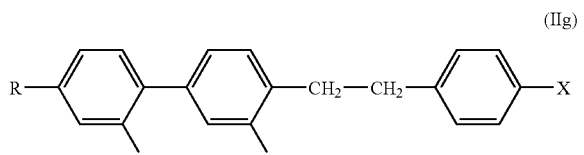

in which
R is an alkyl radical having 1–7 carbon atoms, and X is Cl;

ii) one or more additional compounds of the formula (VIa)

(VIa)
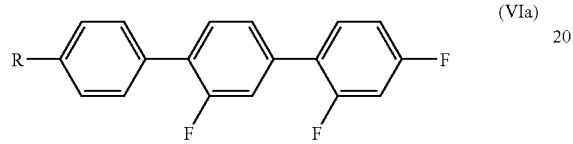

in which
R is an alkyl radical having 1–7 carbon atoms;

d) one or more additional compounds of formulae (VIIa) and/or (VIIb)

(VIIa)
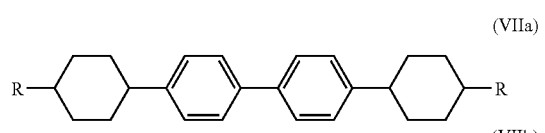

(VIIb)
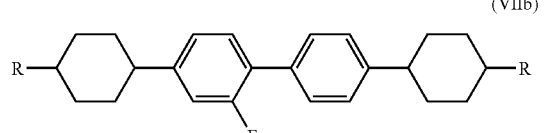

in which
R is an alkyl radical having 1–7 carbon atoms; and e) one or more of the compounds of formula (VIIIa) and/or one or more additional compounds of formulae (IXa), (IXb) and (Xa)

(VIIIa)
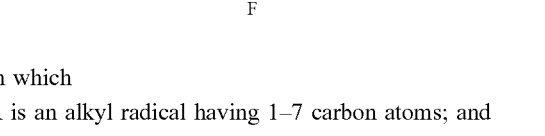

in which
R is an alkyl radical having from 1 to 7 carbon atoms, (IXa)
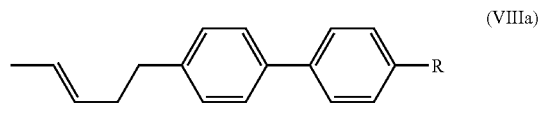

-continued (IXb)
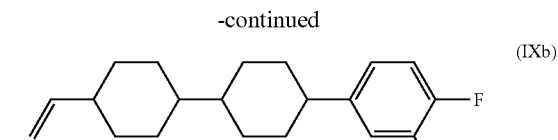

(Xa)
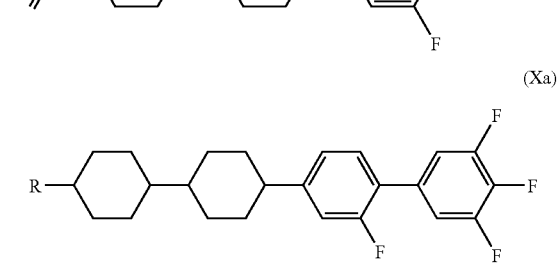

in which
R is an alkyl radical having 1–7 carbon atoms.

6. A liquid-crystalline medium according to claim 1, wherein said medium contains:
  a) 1–50% by weight of one or more compounds of the formula (I),
  b1) 5–50% by weight of one or more compounds of the formula (IIe)

(IIe)
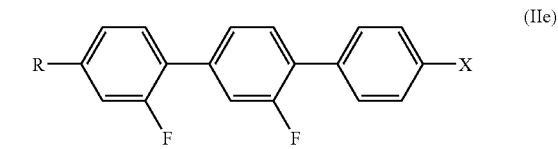

in which
R is an alkyl radical having 1–7 carbon atoms, and X is Cl, b2) 5–50% by weight of one or more compounds of the formula (IIg)

(IIg)
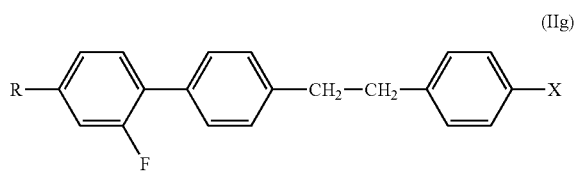

in which
R is an alkyl radical having 1–7 carbon atoms, and X is Cl, c) 0–30% by weight of one or more additional compounds of the formula (VIa)

(VIa)
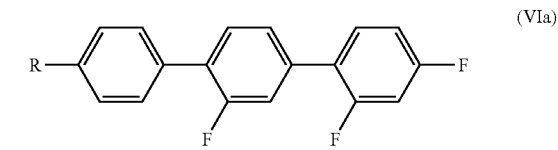

in which

R is an alkyl radical having 1–7 carbon atoms, d) 0–20% by weight of one or more additional compounds of the formulae (VIIa) and/or (VIIb)

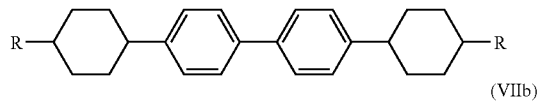
(VIIa)

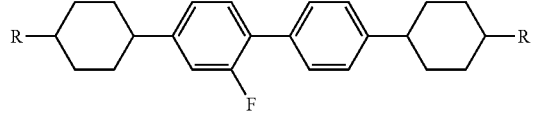
(VIIb)

in which

R is an alkyl radical having 1–7 carbon atoms, e1) 0–40% by weight of one or more compounds of the formula (VIIIa)

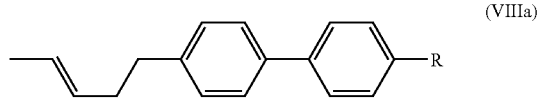
(VIIIa)

in which

R is an alkyl radical having from 1 to 7 carbon atoms, e2) 0–40% by weight of one or more additional compounds of the formulae (IXa) and/or (IXb)

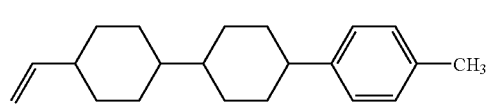
(IXa)

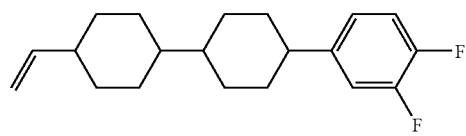
(IXb)

in which

R is an alkyl radical having 1–7 carbon atoms, and e3) 0–25% by weight of one or more additional compounds of the formula (Xa)

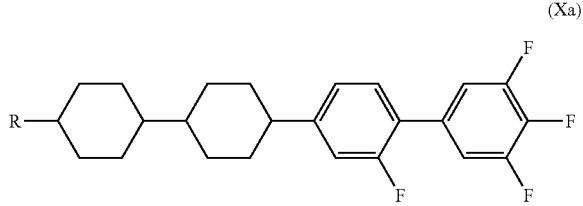
(Xa)

in which

R is an alkyl radical having 1–7 carbon atoms.

7. A liquid-crystalline medium according to claim 6 wherein said medium contains:

a) 5–50% by weight of one or more compounds of the formula (I), b1) 10–40% by weight of one or more compounds of the formula (IIe), b2) 10–40% by weight of one or more compounds of the formula (IIg), c) 2–20% by weight of one or more compounds of the formula (VIa), d) 2–15% by weight of one or more compounds of the formulae (VIIa) and/or (VII$b$), e1) 5–20% by weight of one or more compounds of the formula (Va), e2) 5–30% by weight of one or more compounds of the formulae (IXa) and/or (IXb), and e3) 2–20% by weight of one or more compounds of the formula (Xa).

8. In electro-optical display element containing a liquid-crystalline medium, the improvement wherein said medium is according to claim 1.

9. A liquid-crystalline medium according to claim 1, wherein said medium contains one or more compounds of formula II.

10. A liquid-crystalline according to claim 1, wherein said medium contains one or more compounds of formula VIII in which one R group is alkyl and the other R group is alkenyl.

11. A liquid-crystalline medium according to claim 1, wherein said medium contains one or more compounds of formula VIII(a)

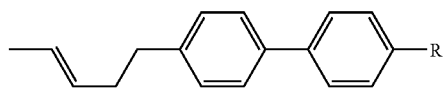
(VIIIa)

wherein

R is an alkyl radical having from 1 to 7 carbon atoms.

12. A liquid-crystalline medium according to claim 11, wherein R in formula VIIIa is methyl.

13. A liquid-crystalline medium according to claim 1, wherein said medium further contains one or more compounds of formula VI and/or formula VII $$R\text{-}k\text{-}l\text{-}m\text{-}R^1 \qquad (VI)$$

$$R\text{-}n\text{-}o\text{-}p\text{-}q\text{-}R \qquad (VII)$$

wherein k is 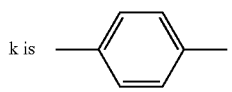

l and m, independently of one another, can be

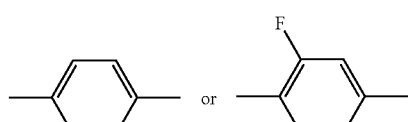

R is an alkyl, alkoxy or alkenyl radical having from 1 to 15 or 2 to 15 carbon atoms respectively, in which one or more $CH_2$ groups may be replaced by —O— in such a way that oxygen atoms are not adjacent, $R^1$ is 'F, —Cl, or an alkyl, alkoxy or alkenyl radical having 1–15 or 2–15 carbon atoms respectively, in which one or more CH$_2$ groups may be replaced by —O— in such a way that oxygen atoms are not adjacent, n is 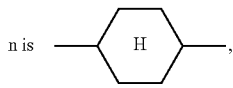, o and p are each independently

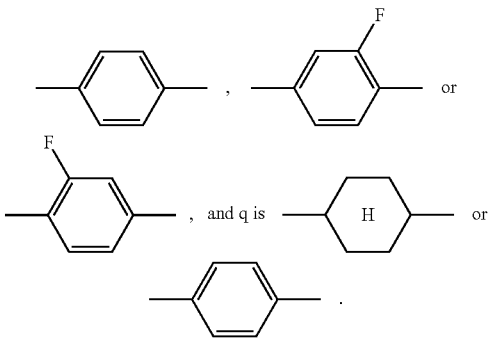

14. A liquid-crystalline medium according to claim 13, wherein the compounds of formulae (VI) and (VII) are selected from formulas (VIa) to (VIc) and formulas (VIIa) to (VIIg), respectively,

|  |  |
|---|---|
| R-P-Gl-Gl-F | (VIa) |
| R-P-Gl-Gl-Cl | (VIb) |
| R-P-G-P-R | (VIc) |
| R-C-P-P-C-R | (VIIa) |
| R-C-G-P-C-R | (VIIb) |
| R-C-P-G-P-R | (VIIc) |
| R-C-P-Gl-P-R | (VIId) |
| R-C-G-P-P-R | (VIIe) |
| R-C-Gl-P-P-R | (VIIf) |
| R-C-Gl-P-C-R | (VIIg) | in which
R are each independent of one another,

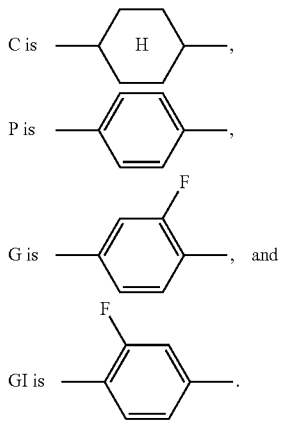

15. A liquid-crystalline medium according to claim 14, wherein R in the formulae (VI) and (VII) is an alkyl radical having from 1 to 7 carbon atoms.

16. A liquid-crystalline medium having a dielectric anisotropy $\Delta\epsilon$ of $\geqq 3$, comprising
   a) 1 to 50% by weight of one or more compounds of formula (I)

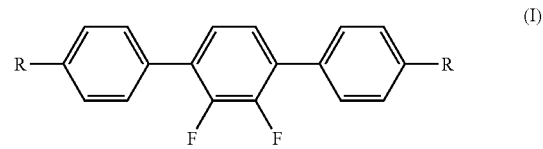

wherein
R, independently of one another, are each an alkyl having 1–15 alkoxy having 1–15 or alkenyl radical having 2–15 carbon atoms, wherein in each case one or more CH$_2$ groups may be replaced by —O— in such a way that oxygen atoms are not adjacent;
   b) 5 to 90% by weight of one or more compounds of formulae (II) to (V)

R-a-b-Z-c-X    (II)

R-d-e-f-X    (III)

R-e-f-X    (IV)

R-g-h-i-j-X    (V)

wherein
a, b and c, independently of one another, can be

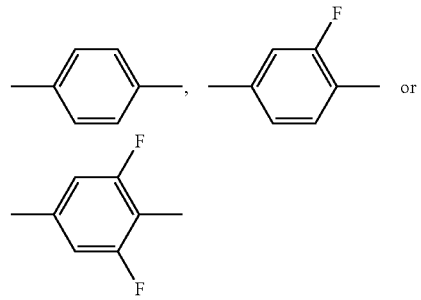

R is an alkyl having from 1 to 15, alkoxy having from 1 to 15 or alkenyl radical having from 2 to 15 carbon atoms, in which in each case one or more CH$_2$ groups may be replaced by —O— in such a way that oxygen atoms are not adjacent,
X is —F, —OCF$_3$, —OCF$_2$H, —Cl or —CF$_3$,
Z is a single bond or —CH$_2$—CH$_2$—,

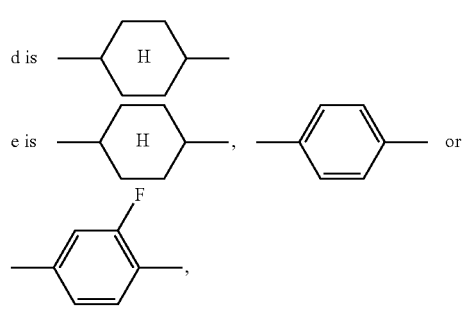

-continued f is 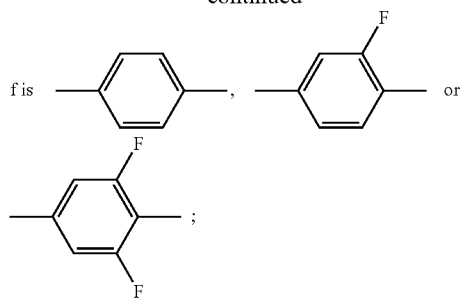

g is 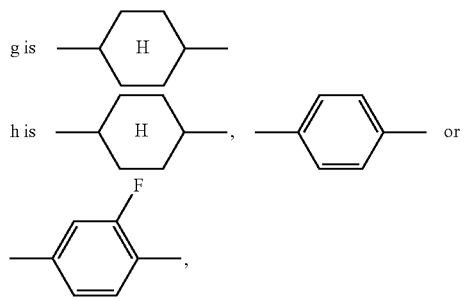

h is 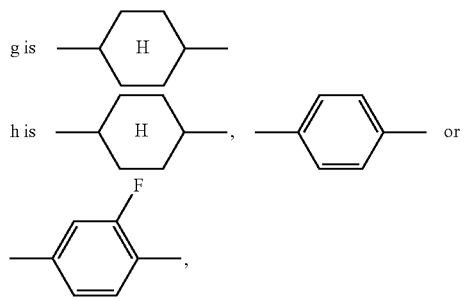, and i and j are each independently

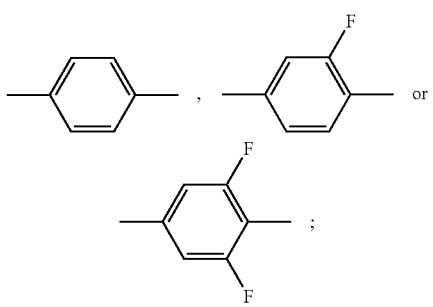

c) 0 to 30% by weight of one or more compounds of formula (VI)
wherein k is 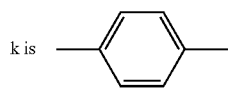

l and m, independently of one another, can be

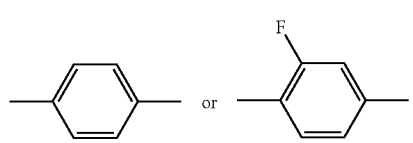

R is as defined above, and $R^1$, is —F, —Cl, or an alkyl having 1–15, alkoxy having 1–15 or alkenyl having 2–15 carbon atoms, in which in each case one or more $C_2$ groups may be replaced by —O— in such a way that oxygen atoms are not adjacent;

d) 0 to 20% by weight of one or more compounds of formula (VII)

R-n-o-p-q-R  (VII)

wherein n is 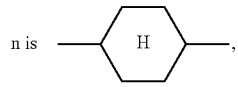, o and p are each independently

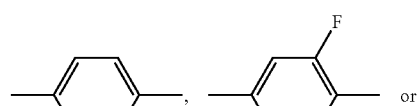

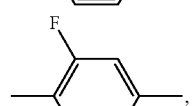, q is 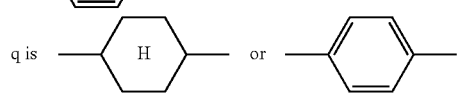

and

R are independent of one another and are as defined above; and e) 0 to 50% by weight of one or more compounds of formulae (VIII), (IX) and/or (X)

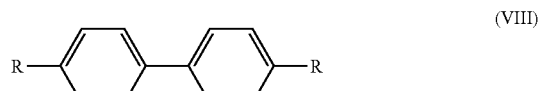 (VIII)

R-r-s-t-$R^2$  (IX)

R-r-s-t-u-F  (X)

wherein

R are independent of one another and are as defined above,

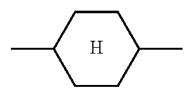

t can be 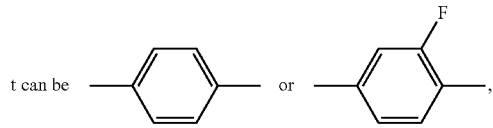,

-continued u is 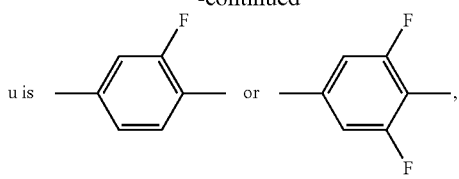

and

R², is —F or an alkyl having 1–15, alkoxy having 1–15 or alkenyl having 2–15 carbon atoms, in which in each case one or more CH₂ groups may be replaced by —O— in such a way that oxygen atoms are not adjacent;

wherein the sum of components a) to e) is 100% by weight; and wherein component b) comprises b1) 20 to 80% by weight of one or more compounds of formula (II), and b2) 80 to 20% by weight of one or more compounds of formulae (III) to (V), wherein the sum of components b1) and b2) is 100% by weight.

17. A liquid-crystalline medium having a dielectric anisotropy Δε of ≧3, comprising:

one or more compounds of formula (I)

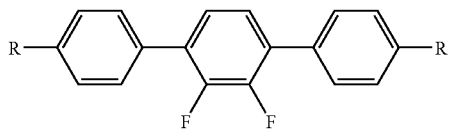 (I)

in which

R, independently of one another, are each alkyl having 1–15, alkoy having 1–15 or alkenyl having 2–15 carbon atoms respectively, in which one or more CH₂ groups may be replaced by —O— in such a way that oxygen atoms are not adjacent;

one or more compounds of formulae (IIe) and/or (IIg)

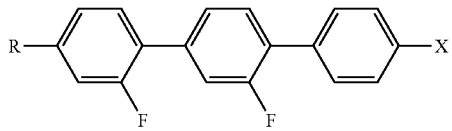 (IIe)

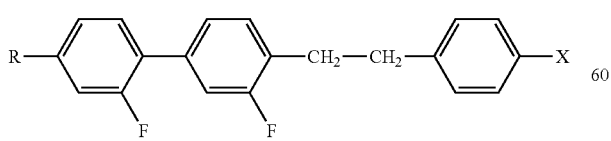 (IIg)

wherein

R is an alkyl radical having 1–7 carbon atoms, and X is Cl:

one or more compounds of the formula (VIa)

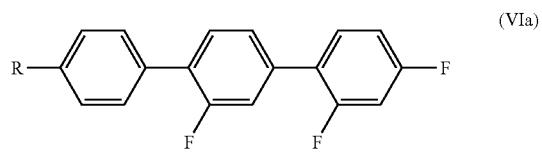 (VIa)

in which

R is an alkyl radical having 1–7 carbon atoms;

one or more compounds of formulae (VIIa) and/or (VIIb)

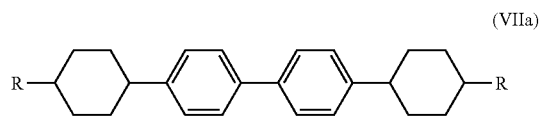 (VIIa)

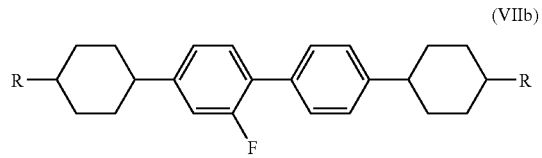 (VIIb)

in which

R is an alkyl radial having 1–7 carbon atoms; and one or more compounds of formulae (VIIa), (IXa), (IXb) and (Xa)

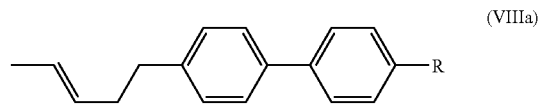 (VIIIa)

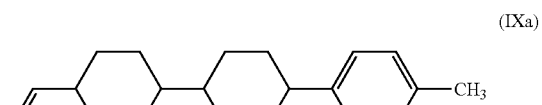 (IXa)

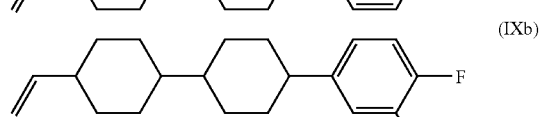 (IXb)

 (Xa)

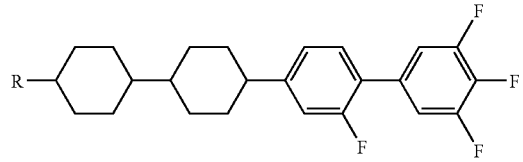

wherein

R is an alkyl radical having 1–7 carbon atoms.

18. A liquid-crystalline medium according to claim 17, wherein said medium consists essentially of compounds of the formulae a) (I)

b) (IIe) and/or (IIg)

c) (VIa)

d) (VIIa) and/or (VIIb)
e) (VIIa), (IXa), (IXb) and/or (Xa).

19. A liquid-crystalline medium according to claim 18, wherein said medium consists essentially of:
a) 1–50% by weight of one or more compounds of the formula (I),
b1) 5–50% by weight of one or more compounds of the formula (IIe),
b2) 5–50% by weight of one or more compounds of the formula (IIg),
c) up to 30% by weight of one or more compounds of the formula (IIg),
d) up to 20% by weight of one or more compounds of the formulae (VIIa) and/or (VIIb),
e1) up to 40% by weight of one or more compounds of the formula (VIIIa),
e2) up to 40% by weight of one or more compounds of the formulae (IXa) and/or (IXb), and
e3) up to 25% by weight of one or more compounds of the formula (Xa).

20. A liquid-crystalline medium according to claim 19, wherein said medium consists essentially of:
a) 5–50% by weight of one or more compounds of the formula (I),
b1) 10–40% by weight of one or more compounds of the formula (IIe),
b2) 10–40% by weight of one or more compounds of the formula (IIg),
c) 2–20% by weight of one or more compounds of the formula (VIa),
d) 2–15% by weight of one or more compounds of the formulae (VIIa) and/or (VIIb),
e1) 5–20% by weight of one or more compounds of the formula (VIIIa),
e2) 5–30% by weight of one or more compounds of the formulae (IXa) and/or (IXb), and
e3) 2–20% by weight of one or more compounds of the formula (Xa).

21. In electro-optical display element containing a liquid-crystalline medium, the improvement wherein said mdiium is according to claim 9.

22. In electro-optical display element containing a liquid-crystalline medium, the improvement wherein said medium is according to claim 10.

23. In electro-optical display element containing a liquid-crystalline medium, the improvement wherein said medium is according to claim 11.

24. In electro-optical display element containing a liquid-crystalline medium, the improvement wherein said medium is according to claim 12.

25. In electro-optical display element containing a liquid-crystalline medium, the improvement wherein said medium is according to claim 16.

26. In electro-optical display element containing a liquid-crystalline medium, the improvement wherein said medium is according to claim 17.

27. A liquid-crystalline medium according to claim 1, wherein said medium contains:
a) 1 to 50% by weight of one or more compounds of formula (I);
b) 5 to 90% by weight of one or more compounds selected from formula (II) and/or one or more additional compounds selected from formulae (III) to (V)

R-a-b-Z-c-X (II);

R-d-e-f-X (III)

in which

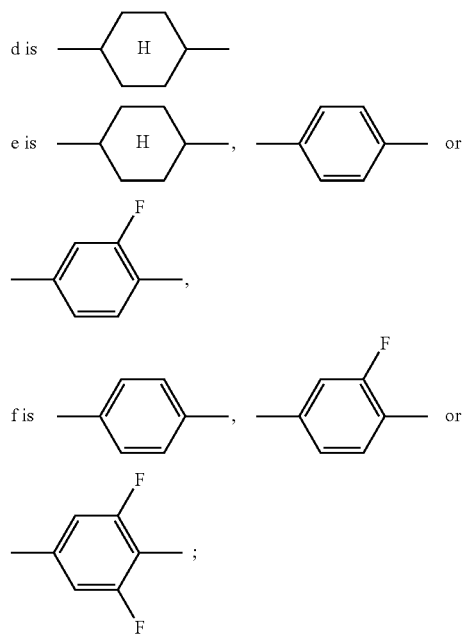

R is an alkyl, alkoxy or alkenyl radical having from 1 to 15 or 2 to 15 carbon atoms respectively, in which one or more $CH_2$ groups may be replaced by —O— in such a way that oxygen atoms are not adjacent, X is —F, —OCF3, —OCF2H, —Cl or —CF$_3$;

R-e-f-X (IV)

in which e, f, R and X are as defined above;

R-g-h-i-j-X (V)

in which

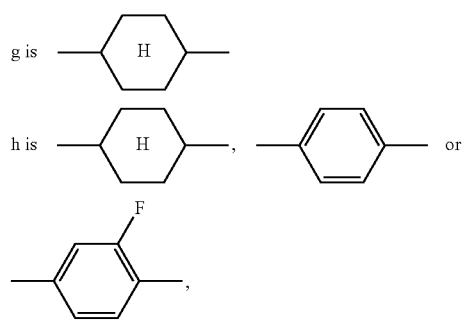

i and j are each independently

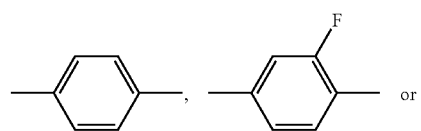

-continued

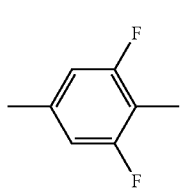

and R and X are as defined above;

c) 0 to 30% by weight of one or more additional compounds of formula (VI)

R-k-l-m-R¹ (VI)

in which k is 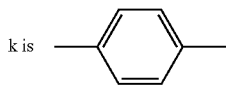

l and m, independently of one another, can be

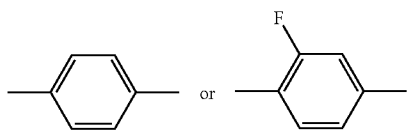

R is as defined above, and

R¹, is —F, —Cl, or an alkyl, alkoxy or alkenyl radical having 1–15 or 2–15 carbon atoms respectively, in which one or more CH$_2$ groups may be replaced by —O— in such a way that oxygen atoms are not adjacent;

d) 0 to 20% by weight of one or more additional compounds of formula (VII)

R-n-o-p-q-R (VII)

in which n is 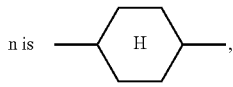

o and p are each independently

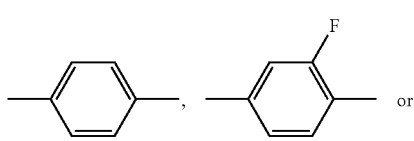

-continued

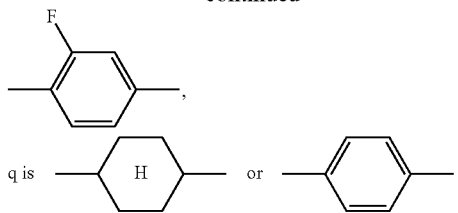

q is 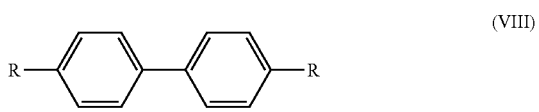

and

R are independent of one another and are as defined above; and e) up to 50% by weight of one or more compounds selected from formula (VIII), and formulae (IX) and/or (X)

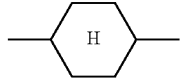 (VIII)

R-r-s-t-R² (IX)

R-r-s-t-u-F (X)

in which

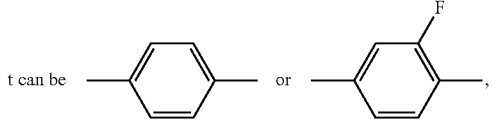

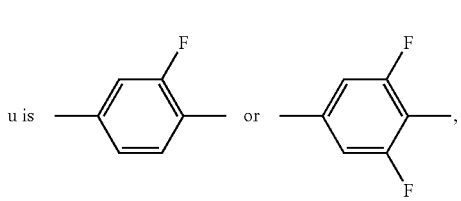

R is as defined above, and

R², is —F or an alkyl, alkoxy or alkenyl radical having 1–15 or 2–15 carbon atoms respectively, in which one or more CH$_2$ groups may be replaced by —O— in such a way that oxygen atoms are not adjacent;

where the sum of components a) to e) is 100% by weight.

28. A liquid-crystalline medium according to claim 27, wherein component b) comprises,
   b1) 20 to 80% by weight of one or more compounds of formula (II), and
   b2) 80 to 20% by weight of one or more compounds of formulae (III) to (V), where the sum of components b1) and b2) is 100% by weight.

* * * * *

UNITED STATES PATENT AND TRADEMARK OFFICE
CERTIFICATE OF CORRECTION

PATENT NO. : 7,090,899 B2  Page 1 of 1
APPLICATION NO. : 10/658471
DATED : August 15, 2006
INVENTOR(S) : Matthias Bremer It is certified that error appears in the above-identified patent and that said Letters Patent is hereby corrected as shown below:

Column 16, line 52, reads "alkoxy alkenyl" should read -- alkoxy, alkenyl --
Column 17, line 25, reads "acording to" should read -- according to --
Column 17, line 63, reads "alkoxy or radical" should read -- alkoxy or alkenyl radical --
Column 18, line 63, reads "$R^1$, is" should read -- $R^1$ is --
Column 19, line 35, reads "formula formulae" should read -- formulae --
Column 19, line 30, insert -- r and s are each independently --
Column 20, line 2, reads "$R^2$, is" should read -- $R^2$ is --
Column 20, line 11, reads "(Va) to Vd)" should read -- (Va) to (Vd) --
Column 21, line 9, should read

--

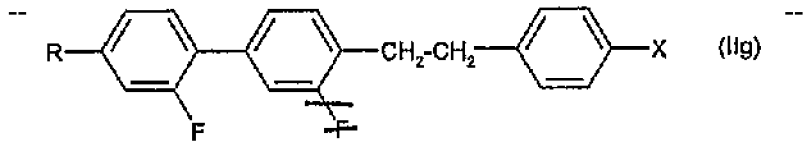

--

Column 24, line 8, reads "(VII*b*)," should read -- (VIIb), --
Column 24, line 10, reads "formula (Va)," should read -- formula (VIIIa), --
Column 24, line 66, reads "is 'F," should read -- is –F, --
Column 25, line 29, reads "from formulas" should read -- from formulae --

Signed and Sealed this

Sixth Day of November, 2007

JON W. DUDAS
*Director of the United States Patent and Trademark Office*

UNITED STATES PATENT AND TRADEMARK OFFICE
CERTIFICATE OF CORRECTION

PATENT NO. : 7,090,899 B2
APPLICATION NO. : 10/658471
DATED : August 15, 2006
INVENTOR(S) : Matthias Bremer It is certified that error appears in the above-identified patent and that said Letters Patent is hereby corrected as shown below:

Column 16, line 52, reads "alkoxy alkenyl" should read -- alkoxy, alkenyl --
Column 17, line 25, reads "acording to" should read -- according to --
Column 17, line 63, reads "alkoxy or radical" should read -- alkoxy or alkenyl radical--
Column 18, line 63, reads "$R^1$, is" should read -- $R^1$ is --
Column 19, line 30, insert -- r and s are each independently --
Column 19, line 35, reads "formula formulae" should read -- formulae --
Column 20, line 2, reads "$R^2$, is" should read -- $R^2$ is --
Column 20, line 11, reads "(Va) to Vd)" should read -- (Va) to (Vd) --
Column 21, line 9, should read

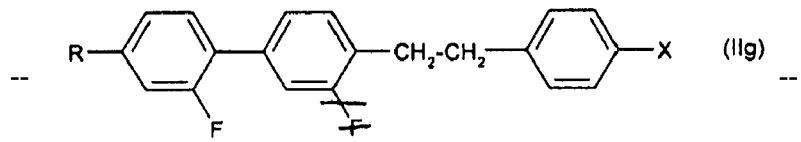

Column 24, line 8, reads "(VII*b*)," should read -- (VIIb), --
Column 24, line 10, reads "formula (Va)," should read -- formula (VIIIa), --
Column 24, line 66, reads "is 'F," should read -- is –F, --
Column 25, line 29, reads "from formulas" should read -- from formulae --
Column 25, line 29, reads "and formulas" should read -- and formulae --
Column 26, line 2, reads "ropy Δε of ≧ 3" should read -- ropy Δε of ≥ 3 --
Column 26, line 16, reads "1-15 alkoxy" should read -- 1-15, alkoxy --
Column 27, line 50, insert -- R-k-l-m-$R^1$ --
Column 28, line 1, reads "$R^1$, is" should read -- $R^1$ is --
Column 28, line 33, should read

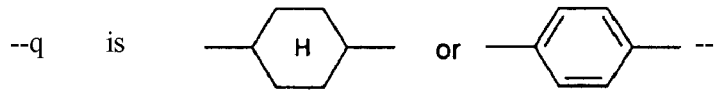

Column 28, line 57, insert -- r and s are each independently --
Column 29, line 12, reads "$R^2$, is" should read -- $R^2$ is--
Column 29, line 44, reads "alkoy" should read -- alkoxy --
Column 29, line 63, should read

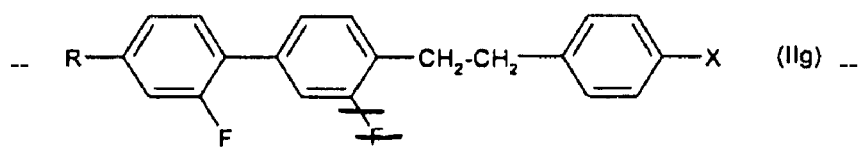

UNITED STATES PATENT AND TRADEMARK OFFICE
CERTIFICATE OF CORRECTION

PATENT NO. : 7,090,899 B2
APPLICATION NO. : 10/658471
DATED : August 15, 2006
INVENTOR(S) : Matthias Bremer It is certified that error appears in the above-identified patent and that said Letters Patent is hereby corrected as shown below:

Column 30, line 28, reads "alkyl radial" should read -- alkyl radical --
Column 31, line 2, reads "(VIIa), (IXa)," should read -- (VIIIa), (IXa), --
Column 31, line 12, reads "formula (IIg)," should read -- formula (VIa), --
Column 31, line 40, reads "said mdiium" should read -- said medium --
Column 32, line 34, reads "-OCF3, -OCF2H," should read -- $-OCF_3$, $-OCF_2H$, --
Column 33, line 36, reads "$R^1$, is" should read -- $R^1$ is --
Column 34, line 30, insert -- r and s are each independently --
Column 34, line 50, reads "$R^2$, is" should read -- $R^2$ is --

Signed and Sealed this

Eleventh Day of March, 2008

JON W. DUDAS
*Director of the United States Patent and Trademark Office*